March 19, 1968 — A. T. FLETCHER — 3,373,488
GLASS CUTTING APPARATUS
Filed Jan. 25, 1967
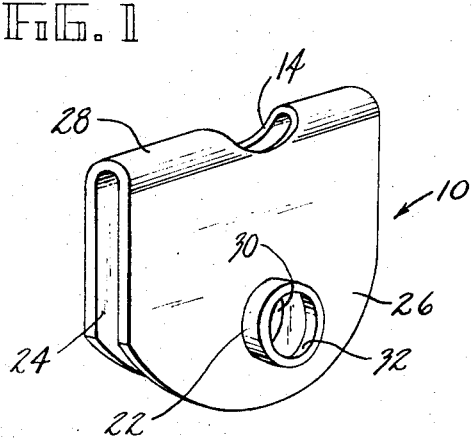
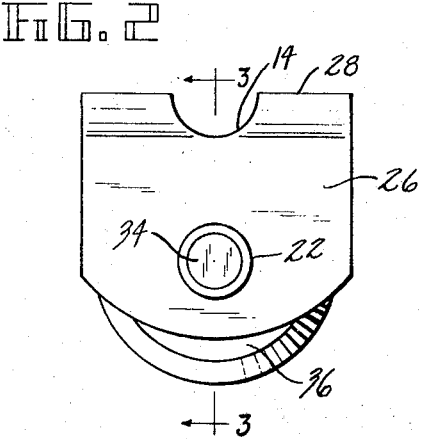
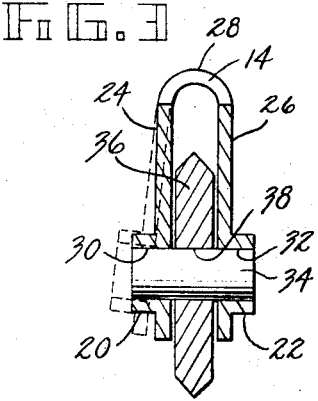
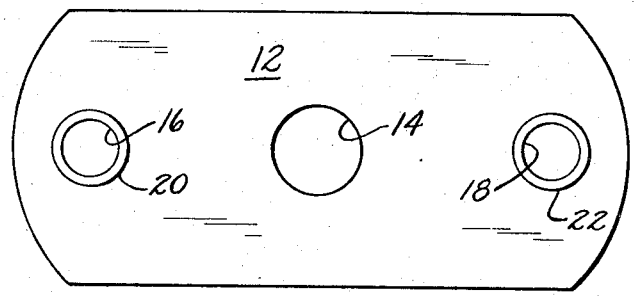
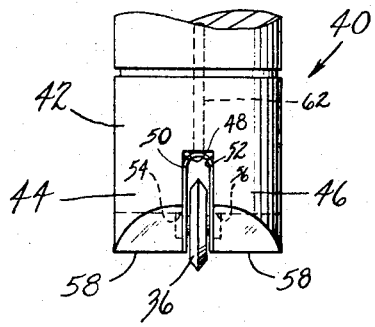
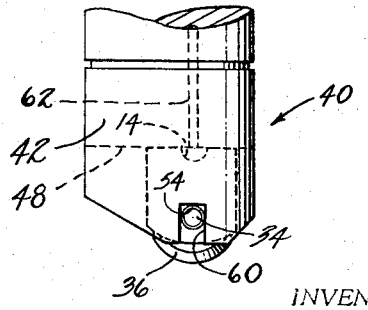
INVENTOR.
Arthur T. Fletcher
BY
ATTORNEYS

United States Patent Office 3,373,488
Patented Mar. 19, 1968

3,373,488
GLASS CUTTING APPARATUS
Arthur T. Fletcher, Bristol, Conn., assignor to The Fletcher-Terry Company, Bristol, Conn., a corporation of Connecticut
Filed Jan. 25, 1967, Ser. No. 611,623
5 Claims. (Cl. 30—164.95)

ABSTRACT OF THE DISCLOSURE

A glass cutting device including a cutting wheel and axle supported in a retainer therefor, the retainer being received in glass cutting position within a holder. The retainer is formed with axle supporting bearing surfaces provided by outwardly extending flanges which also cooperate with abutment surfaces on the holder to position the retainer and wheel within the holder.

SPECIFICATION

This invention relates to glass cutting devices and is particularly directed to a removable glass cutting wheel retainer for use in connection with a holder for supporting the cutting wheel in glass cutting position.

In glass cutting, especially machine glass cutting on a production basis, relatively frequent cutting wheel changes may be required. Obviously, machine "downtime" occasioned by such changes will be minimized if the change may be made easily, rapidly, and without the requirement of special equipment or tools. It is also obvious that machine "downtime" will be even more materially reduced if the effective operating life of the cutting wheel is increased thereby reducing the frequency of cutting wheel changes.

It is the primary purpose of the present invention to provide a retainer for a glass cutting wheel adapted for insertion into either a hand-held or machine-operated holder and which is arranged to support a cutting wheel and axle in a glass cutting attitude therein; to provide such a retainer formed from a sheet metal blank preferably of spring steel which may be hardened to resist axle wear; to provide such a retainer having an increased area of axle bearing surface whereby the holder is provided with a replaceable wear surface which effectively eliminates holder wear occasioned by direct contact between the holder and the wheel-supporting axle during a glass cutting operation. It is a further object of the present invention to provide a cutting wheel retainer which is of simple construction, the manufacture of which will be economical and which may be quickly and easily inserted into a holder therefor, which is releasably retained therein by frictional resistance and which is readily removable therefrom without the requirement of special tools or equipment.

The drawing shows a preferred embodiment of the invention and such embodiment will be described, but it will be understood that various changes may be made from the construction disclosed, and that the drawing and the description are not to be construed as defining or limiting the scope of the invention, the claims forming a part of this specification being relied upon for that purpose.

In the drawing:

FIG. 1 is a perspective view of the wheel retainer of the present invention;

FIG. 2 is a side elevational view thereof shown with a glass cutting wheel and axle positioned therein in glass cutting attitude;

FIG. 3 is an elevational view taken along line 3—3 of FIG. 2 showing the wheel and retainer in section;

FIG. 4 is a plan view of the blank of spring steel from which the retainer of the present invention is formed, apertured to provide lubricating access and axle-receiving apertures;

FIG. 5 is a front elevational view of the wheel-receiving portion of a glass cutting wheel holder showing the cutting wheel, axle and wheel retainer, drawn to a reduced scale, in glass cutting position in the bifurcated lower portion of the holder; and FIG. 6 is a side elevational view of the portion of the holder shown in FIG. 5 further illustrating the position of the retainer and wheel in glass cutting position therein.

The improved glass cutting wheel retainer of the present invention is constructed and arranged for use in connection with either a manually operated or machine operated cutting wheel holder. For purposes of illustration only, however, I have shown the retainer as used in connection with a holder of the general type commonly used for a machine glass cutting operation. The general construction of the retainer receiving portion thereof is, nevertheless, substantially similar to that of the manually operated holder.

As shown in the drawing, the cutting wheel retainer 10 is preferably formed from an elongated blank 12 of spring steel which is provided with a centrally located lubricating aperture 14 positioned at the inter-section of the longitudinal and transverse centerlines of the blank 12. The blank is also formed with axle-receiving annular apertures 16 and 18 equally spaced from the said transverse centerline, each aperture having its center preferably lying on said longitudinal centerline or on a line parallel therewith. Annular flanges 20 and 22 surrounding the periphery of the apertures 16 and 18 are formed to extend outwardly from a common face of the blank and are disposed normal thereto.

To form the retainer 10, the blank 12 is bent about its transverse centerline into a downwardly opening, generally U-shaped configuration, as shown, to provide a pair of spaced side walls 24 and 26 joined at their upper ends by an integral bight portion 28 disposed intermediate the pair of side walls. It will be apparent to those skilled in the art that the lubricating aperture 14 will thus lie in the bight portion of the retainer spaced from and above the annular, axle-receiving apertures 16 and 18 which, as shown in FIG. 3, are coaxially aligned with the annular flanges 20 and 22 extending outwardly in opposite directions from the periphery thereof. The inner cylindrical surfaces 30 and 32 of the flanges are therefore likewise coaxially aligned and arranged to receive and support an axle 34 as a bearing surface therefor.

A glass cutting wheel 36, centrally apertured as at 38 for mounting upon the axle 34, is positionable between the spaced side walls 24 and 26 in glass cutting attitude with the axle 34 extending through the apertures 16 and 18, supported by the cylindrical bearing surfaces 30 and 32.

As the blank 12 is preferably made of spring steel, the side walls 24 and 26 may be separated or sprung apart, if required, sufficiently to permit the wheel and axle to be received therebetween to position the opposite ends of the axle through the apertures 16 and 18.

While the holder 40 may take many forms, that illustrated in FIGS. 5 and 6 is typical and includes a bifurcated head portion 42 having furcations 44 and 46 which are adapted for releasably receiving the retainer 10 therebetween in operative position for engaging the surface of a sheet of glass. An abutment surface 48 extends between the furcations 44 and 46 and opposed spaced-apart interior side walls 52 and 54 of the furcations 44 and 46, respectively, lie in parallel planes dimensioned to receive the retainer 10 therebetween with the bight 28 preferably in abutting engagement with the intermediate abutment surface 48 when the wheel 36 is disposed in glass cutting attitude. Abutment surfaces 54 and 56 are also provided against which the outwardly extending flanges 20 and 22 may bear when the retainer is positioned within the holder. The surfaces 54 and 56 are spaced between the abutment surface 48 and the free ends 58 of the furcations 44 and 46 and may be formed by recessing the said free ends to provide a groove 60 therein extending normal to the interior walls 50 and 52. By dimensioning the groove 60 whereby its side walls are parallel and spaced apart only slightly more than the diameter of the annular flanges 20 and 22, the said flanges will be snugly received by the groove 60 and the retainer 10 will be restricted against both forward and rearward movement thereby when disposed in glass cutting position within the holder 40, as shown in FIGS. 5 and 6. Lateral or sidewise movement thereof is prevented by the interior walls 50 and 52.

It will be readily appreciated by those in the art that in forming the blank 12 into the retainer 10 an outwardly directed bias will be created which will normally urge the sides 24 and 26 to diverge or spring outwardly from the bight portion. The outward bias acts to increase the frictional force releasably securing the retainer between the furcations of the holder. It will also be apparent that the retainer, wheel and axle may be readily inserted into the holder 40 without special tools by merely pressing the retainer between the furcations 44 and 46 with the flanges 20 and 22 positioned within the groove 60.

Lubrication of the cutting wheel during the glass cutting operation increases the usable life of both the wheel and the axle as well as improving the cut obtained in the surface of the glass. The lubrication opening 14 permits direct and unobstructed access to the wheel of lubricant flowing through the lubricating bore 62.

It can be seen from the foregoing description that I have provided a novel and unique retainer for a glass cutting wheel and axle which permits the use of hardened spring steel as a bearing surface for the axle supporting wheel and in which substantially increased bearing surface is provided by the extending, axle-supporting flanges to distribute the load carried by the axle occasioned in a glass cutting operation over a larger area of the axle surface thereby increasing the usable life of the axle and decreasing machine "down time." Those skilled in the art will readily appreciate another advantage offered by my novel retainer. The axle-receiving openings in the sides of conventional retainers formed of resilient material but without the outwardly extending axle-supporting flanges often become "out-of-round" or oval shaped as a result of wear. The axle and cutting wheel then tend to tilt and "wobble" during a glass cutting operation and maintaining the cutting wheel in proper glass cutting attitude becomes increasingly difficult, if not impossible. The result is a poor score line and, frequently, wasted material as well as machine "down time."

It is also apparent that the present invention permits a readily replaceable axle-supporting wear surface by merely replacing a worn wheel retainer instead of having to replace a worn holder. This is an especially desirable advantage when using axles made of carbide or the like which are highly resistant to wear themselves but which also cause substantially greater bearing wear than axles made of softer metals.

The invention claimed is:

1. The combination in a glass cutting device of a cutting wheel and axle, a retainer supporting said cutting wheel and axle in glass cutting position for rotation therein and a holder for said retainer, said holder having a bifurcated retainer-receiving portion arranged to receive the retainer between the furcations thereof, and an abutment surface associated with said furcations, said retainer being generally U-shaped in cross-section and formed from a blank of resilient material bent about its transverse centerline providing a pair of parallel side walls spaced apart by an integral bight portion and dimensioned to be releasably retained within the holder between said furcations, an abutment surface on said retainer arranged to coact with said first-mentioned abutment surface functioning to position said retainer within the holder in glass cutting position, and bearing means on said retainer defined by coaxial, outwardly extending annular flanges on said spaced side walls surrounding the periphery of coaxially aligned axle-receiving apertures to support the axle and wheel during a glass cutting operation.

2. The combination of claim 1 wherein said first-mentioned abutment surface extends between said furcations and said second-mentioned cooperating abutment surface on said retainer is defined by the outer face of said bight portion.

3. The combination of claim 1 including opposed, parallel, interior walls formed by the furcations of said holder, said first-mentioned abutment surface being defined by a wall of said recess lying in a plane substantially normal to the planes containing the said interior walls and said second abutment surface is defined by the outer surface of said outwardly extending flanges, said first and second abutment surfaces being arranged to cooperate to position and support the retainer within the holder when said flanges are disposed within said recess.

4. The combination of claim 3 wherein the said retainer side walls are normally biased outwardly and releasably retained within the holder between said interior side walls and in abutting, frictional engagement therewith under the influence of said bias.

5. The combination of claim 1 including cutting wheel lubricating means defined by an aperture in said bight portion and a bore in said head, said aperture and bore being in communication to permit the unobstructed flow of lubricant through said bore and aperture to said wheel during a glass cutting operation.

References Cited

UNITED STATES PATENTS

| 2,096,284 | 10/1937 | Lee | 30—164.95 |
| 2,707,849 | 5/1955 | De Vore | 30—164.95 |
| 3,106,018 | 10/1963 | Judd | 30—164.95 |

OTHELL M. SIMPSON, *Primary Examiner.*

R. V. PARKER, *Assistant Examiner.*